A. BLUEGE.
MACHINE FOR MAKING BOX PARTITIONS, CRATES, OR RACKS.
APPLICATION FILED MAR. 19, 1917.
1,235,646.
Patented Aug. 7, 1917.
4 SHEETS—SHEET 1.
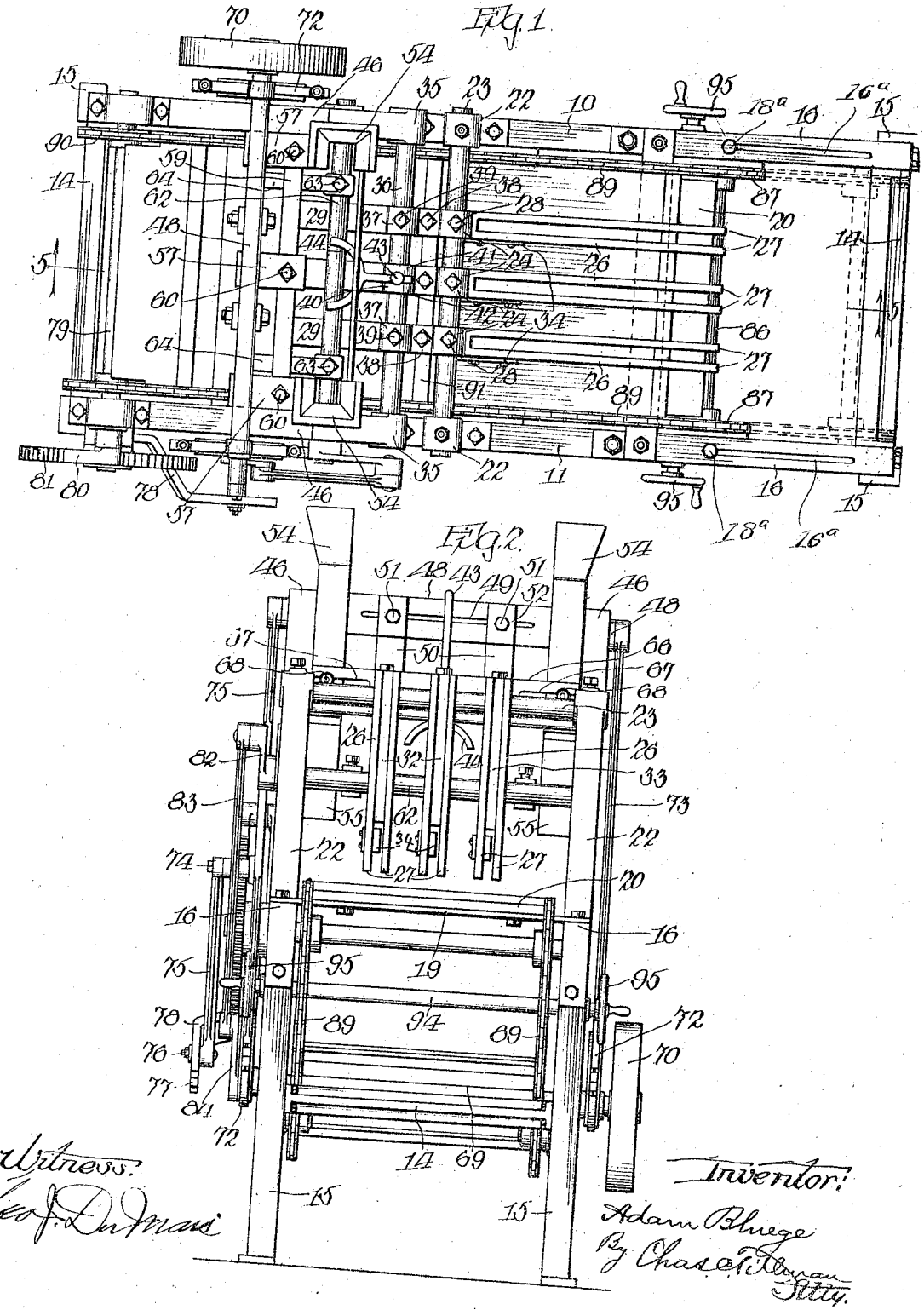

A. BLUEGE.
MACHINE FOR MAKING BOX PARTITIONS, CRATES, OR RACKS.
APPLICATION FILED MAR. 19, 1917.
1,235,646.
Patented Aug. 7, 1917.
4 SHEETS—SHEET 2.
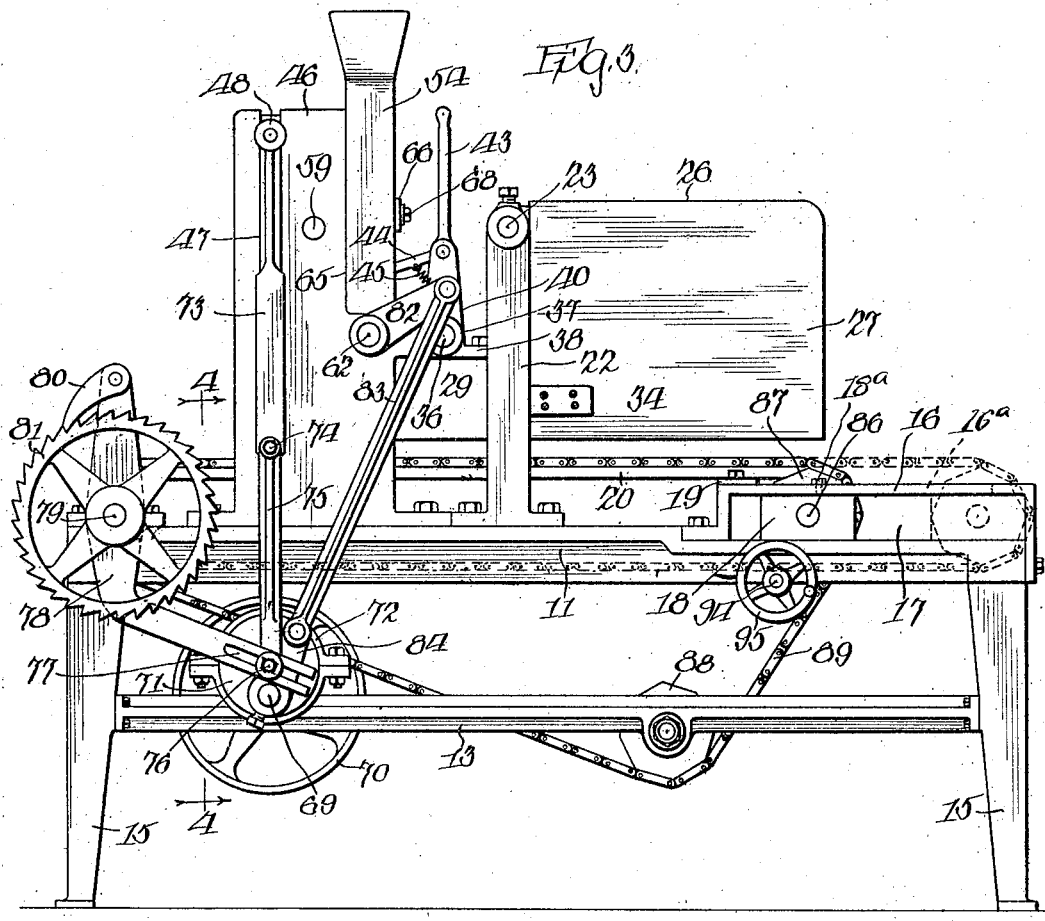
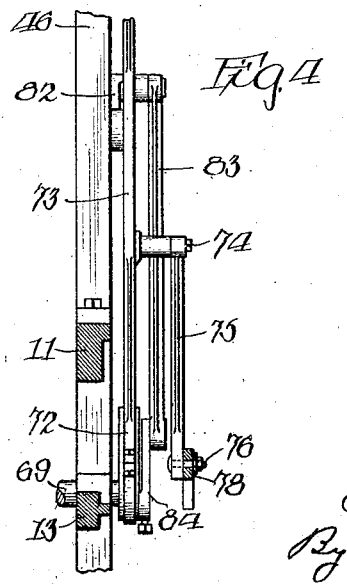

A. BLUEGE.
MACHINE FOR MAKING BOX PARTITIONS, CRATES, OR RACKS.
APPLICATION FILED MAR. 19, 1917.
1,235,646.
Patented Aug. 7, 1917.
4 SHEETS—SHEET 3.
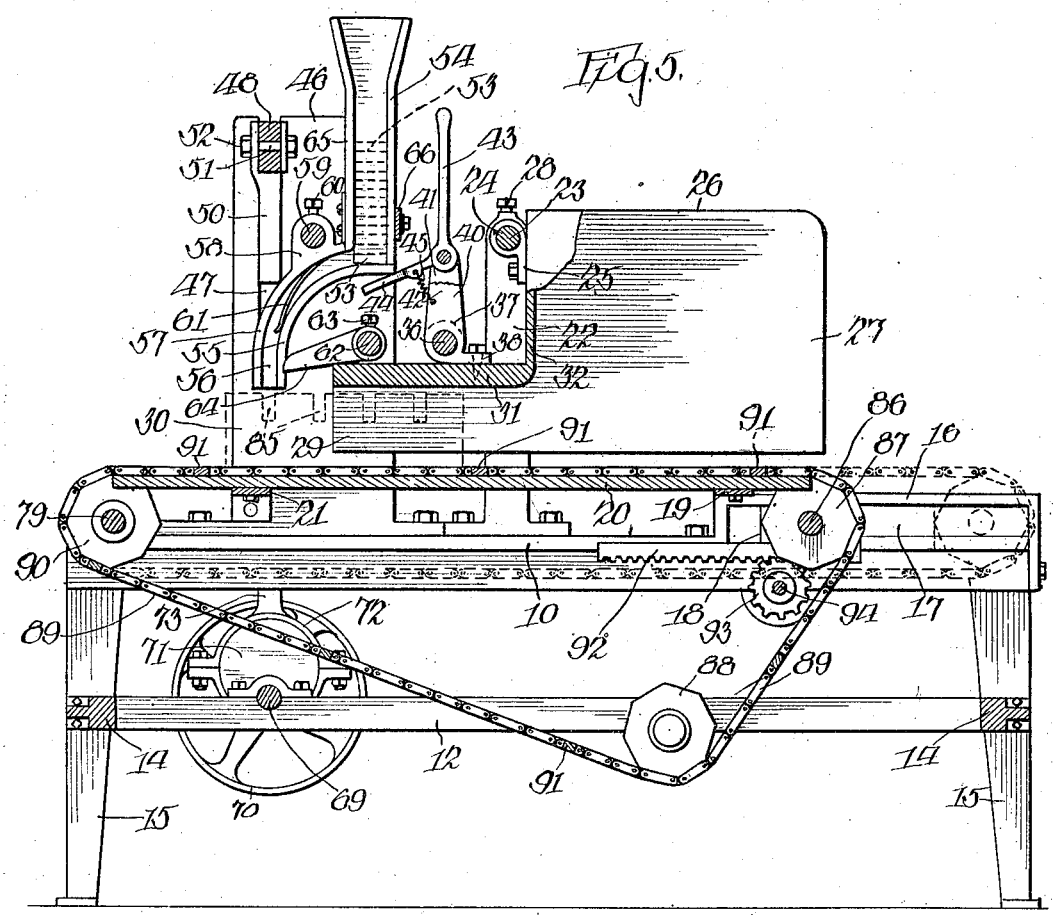
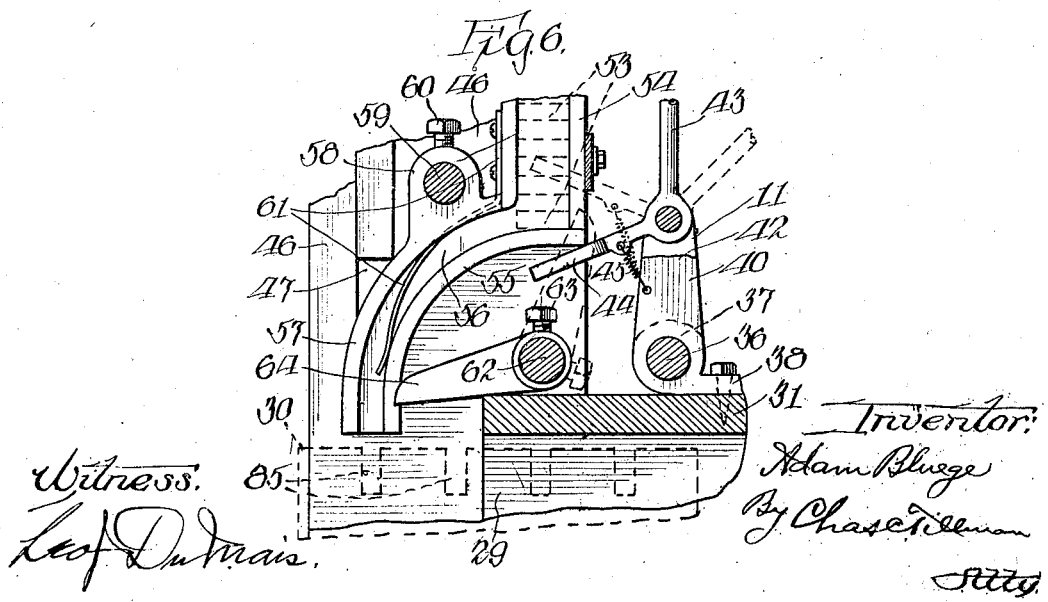

A. BLUEGE.
MACHINE FOR MAKING BOX PARTITIONS, CRATES, OR RACKS.
APPLICATION FILED MAR. 19, 1917.
1,235,646.
Patented Aug. 7, 1917.
4 SHEETS—SHEET 4.
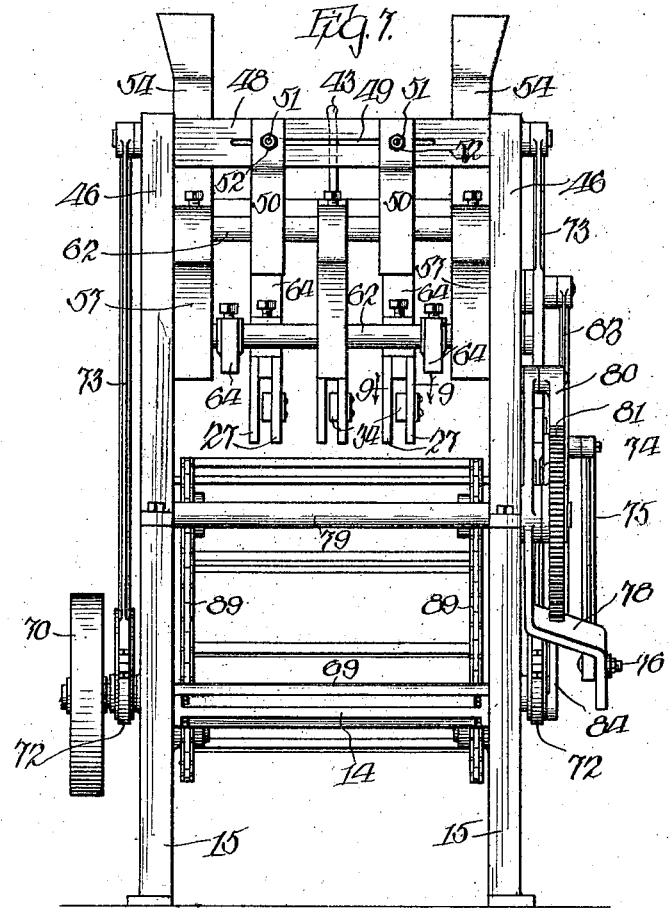
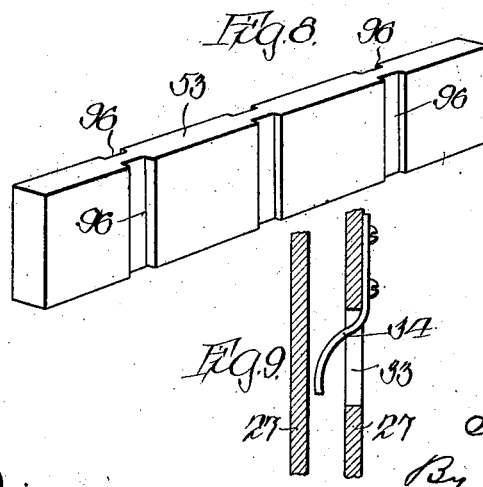

UNITED STATES PATENT OFFICE.

ADAM BLUEGE, OF CHICAGO, ILLINOIS.

MACHINE FOR MAKING BOX-PARTITIONS, CRATES, OR RACKS.

1,235,646.  Specification of Letters Patent.  Patented Aug. 7, 1917.

Application filed March 19, 1917. Serial No. 155,658.

*To all whom it may concern:*

Be it known that I, ADAM BLUEGE, a citizen of the United States, and resident of Chicago, in the county of Cook and State of Illinois, have invented certain new and useful Improvements in Machines for Making Box-Partitions, Crates, or Racks, of which the following is a specification.

This invention relates to improvements in a machine to be employed for assembling and uniting strips or pieces, preferably wooden ones, to form box-partitions, crates or racks, such as are commonly used to space and to hold bottles and the like, and it consists in certain peculiarities of the construction, novel arrangement and operation of the various parts thereof, as will be hereinafter more fully set forth and specifically claimed.

The principal object of the invention is to provide a machine of the above-named general character, which shall be simple and inexpensive in construction, strong, durable and efficient in operation, with its parts so arranged and operating as to automatically assemble and unite two sets of strips or pieces at right angles and in spaced relation to one another, thereby providing a rack or crate with numerous compartments, which rack or crate can be placed and secured in a box or container therefor, if desired. A further object of the invention is to so construct the machine that certain parts thereof can be readily adjusted, to the end, that racks or crates of different sizes, or racks or crates having different sized compartments may be formed or made thereby.

Other objects and advantages of the invention will be disclosed in the subjoined description and explanation.

In the accompanying drawings, which serve to illustrate an embodiment of the invention, Figure 1, is a plan view of the machine.

Fig. 2, is a view looking from the rear or the feeding end thereof.

Fig. 3, is a side view in elevation.

Fig. 4, is a fragmental view, partly in section and partly in elevation, taken on line 4—4 of Fig. 3, looking in the direction of the arrows, showing portions of the mechanism for operating the endless conveyer, and for feeding the transverse strips or bars of the crate or rack to be formed.

Fig. 5, is a vertical longitudinal view, taken on line 5—5 of Fig. 1, looking in the direction indicated by the arrows.

Fig. 6, is an enlarged fragmental view taken on the same line of the same figure illustrating the feeding and controlling mechanism for the transverse bars or strips for the crate or rack.

Fig. 7, is a view in end elevation looking from the discharging or front end of the machine.

Fig. 8, is an enlarged detached perspective view of one of the transverse strips or bars of the crate or rack, and Fig. 9 is a fragmental plan sectional view, taken on line 9—9 of Fig. 7, showing a portion of one of the forward extensions of one of the magazines.

Like numerals of reference, refer to corresponding parts throughout the different views of the drawings.

The main frame of the machine is by preference, rectangular in shape and consists of two top side rails 10 and 11, which are mounted in parallelism and two lower side rails 12 and 13, the lower rails being united at their ends by horizontal cross-pieces or braces 14 which braces, as well as, the rails 10, 11, 12 and 13 are connected to upright legs 15, which support the frame and mechanism of the machine. At the rear or feeding end of the machine each of the rails 10 and 11 have mounted thereon at a slight distance thereabove, a guide-rail 16 which as is clearly shown in Figs. 3 and 5 of the drawings are located horizontally and in parallelism with the rails 10 and 11 and form guide-ways 17 for journal boxes or blocks 18 which are adjustably mounted in said guide-ways for the purpose to be presently explained. The front portions of the rails 16 are transversely connected by means of a bar 19 on which is mounted one end of a table or platform 20 which extends forwardly to near the front end of the main frame and is supported near its front end by means of a horizontal bar 21 extended crosswise of the main frame and suitably mounted thereon. Near its middle portion each of the rails 10 and 11 has mounted thereon an upright 22 the upper portions of which are transversely connected by means of a rod 23 on which are adjustably mounted for lateral movement a number of collars 24 each of which is provided with a depending bracket 25 which is secured to and supports at its upper front portion a vertical chute or guide 26 each of which consists of a pair of vertically disposed parallel members 27 located at a sufficient distance apart to conveniently receive the longitudinal strips, members or pieces of the rack or crate. Each of the collars 24 is provided with a setscrew 28 to be used for fixing the chutes or guides 26 at suitable distances apart, for it is obvious that by loosening said screws, the collars 24 and their brackets 25 carrying the chutes or guides 26 may be moved or adjusted to any suitable points on the rod 23, when by turning the nuts in the proper directions said parts may be fixed on said rod. Each of the chutes 26 has an extension 29 at its lower portion which projects forwardly of the bracket 25 on which the chute is mounted and has two parallel side pieces or continuations of the members 27 of each chute to act as guides for the forward movement of the strips or pieces 30 which go to make up or form the longitudinal pieces or members of the crate or rack. Each of the extensions 29 is closed at its top by means of a horizontal cover 31, and by referring to Fig. 5 of the drawings, it will be seen that the front upper portion of each of the chutes is closed by the vertical pieces or members 32 to the upper end of which the brackets 25 are secured. Below the cover 31 of each of the chutes or magazines 26 one of the members 27 thereof, is provided with an opening 33, (see Fig. 9,) through which is extended one end of a spring 34 which spring is secured to the outer surface of the member 27 through which it is extended. These springs are used to frictionally yet yieldingly hold the strips or members 30 of the crate as they are forced longitudinally between the members 27 by means of an endless conveyer as will be presently explained. Transversely journaled in suitable bearings 35 and located in front of the rod 23 is another rod 36 which lies slightly above the extensions 29 of the chutes, guides or magazines 26 for the longitudinal strips of the crate. Surrounding the rod 36 and slidably mounted thereon, are a number of collars 37 each of which has a lateral extension or bracket 38 which are bolted to the top of the extensions 29 as will be readily understood by reference to Figs. 1, 5, and 6 of the drawings. Each of the collars carries a set screw 39 to be used for fixing the said collars on the rod 36 at any desired points. At about its middle, the rod 36 has mounted thereon a standard 40 which projects upwardly and has its upper portion divided to form a pair of prongs 41 and 42 between which is fulcrumed a bell-crank-lever 43 the lower arm 44 of which is forked and extends forwardly as is clearly shown in Figs. 1, 5 and 6 of the drawings. Connecting the shorter arm 44 on said lever with the standard 40 is a spring 45 which serves to hold the lever 43 in its upright position. Mounted on the side rails 10 and 11, in front of the upright 22 are uprights 46 each of which is provided on its inner surface with a vertical guide-way 47 for the reception and operation of a plunger carrying bar 48 which is provided with a longitudinal slot 49 and has its ends extended through the slots or guide-ways 47 of the uprights 46 as is clearly shown in Figs. 2, 3 and 7 of the drawings. Vertically mounted on the bar 48 between the uprights 46 are a plurality of plungers 50 which are adjustably secured at their upper ends to said uprights by means of bolts 51 and nuts 52 so that said plungers can be adjusted laterally with respect to one another and with respect to the extensions 29 of the chutes or magazines 26, directly in front of but above, a pair of which extensions the plungers 50 are located, so that in their vertical movements they will strike the transverse strips or pieces 53 of the crates or racks as said strips are discharged edgewise from the guides or chutes for said strips.

Vertically mounted at the rear upper portion of each of the uprights 46 is a guide or chute 54 each of which has its upper end upwardly flared and its inner portion open so that the flat strips 53, which go to make up or form the transverse partitions of the crate or rack may be placed so as to rest horizontally one on the other as will be clearly understood by reference to Figs. 5 and 6 of the drawings. The lower end of each of the chutes 54 is provided with a forwardly and downwardly curved floor or member 55 each of which has at its outer edge an upwardly extended flange 56 provided with an inwardly extended member 57 which has the same curvature as the floor or member 55, but as clearly shown in Figs. 5 and 6 is spaced therefrom. The flange or member 57 of each of the chutes 54 is provided on its upper portion with an apertured bracket 58 through which is extended a rod 59 which transversely and horizontally unites the uprights 46. Each of the brackets 58 is provided with a set-screw 60 to fix the members 57 and their chutes 54 at any desired points on the rod 59, for it will be understood that said brackets are slidably mounted on said rod so that they can be adjusted laterally to suit different lengths of the transverse strips 53 of the crate. The rod 59 may be provided at its central portion with a forwardly and downwardly curved member 57 similar in character to the members 57 on the chutes 54, except that the flange 56 is omitted, and said member 57 may be fixed on the rod 59 by means of a set-screw 60 as above described. Secured to the front portion of each of the chutes 54 is one end of a spring 61 which extends at its other end in to the guide formed by the members 55 and 57 so as to frictionally but yieldingly hold the strips 53 of the crate or rack as they are passed through said guide-ways. Horizontally journaled below the lower ends of the chutes 54 is a shaft 62 on which is mounted for lateral adjustment by means of set-screws 63, a plurality of feeding arms 64 which are located near the inner surfaces of the members 55 of the chutes 54 and are of sufficient length so that when raised to the position indicated by dotted lines in Fig. 6 of the drawings, they will engage one of the strips or pieces 53 at its rear edge. The chutes 54 are detachably mounted on the uprights 46 in the vertical recesses 65 formed therein, but are connected together transversely by means of a bar 66 which is provided near each of its ends with longitudinal slots 67 to receive headed bolts 68 used for adjustably securing the chutes 54 thereon in such a manner that they can be adjusted toward or from each other so as to accommodate the transverse strips or pieces 53 of different lengths as is clearly shown in Figs. 1 and 5 of the drawings. The shorter arm or prongs 44 of the lever 43 project forwardly and under the lowermost strip 53 so that by tilting the lever 43 to the position shown by dotted lines in Fig. 6 the discharge of said strips may be prevented or retarded. Transversely and horizontally journaled on the rails 12 and 13 of the main frame of the machine, near the front or discharge end thereof is a driving shaft 69 on one end of which is mounted a pulley 70 to which power may be applied for operating the machine. Near each of its ends the shaft 69 has mounted thereon, an eccentric 71 which is surrounded by a band or collar 72 which has extended therefrom a bar or link 73 which is pivotally connected at its upper end to the end of the plunger carrying bar 48 adjacent thereto. One of the bars or connections 73 has extended therefrom at a suitable distance above the eccentric 71 a stud-shaft 74 to which is pivotally connected the upper end of a connecting rod 75 which has at its lower end a lateral projection 76 engaging a slot 77 in one arm of a bell-crank-lever 78 which is fulcrumed on a shaft 79 transversely journaled on the front portion of the rails 10 and 11 of the main frame. The upper arm of the bell-crank-lever 78 carries a pawl 80 which is adapted to engage the teeth of a ratchet wheel 81 mounted on the end of the shaft 79 adjacent to the said lever. Mounted on the shaft 62 at its end adjacent to the ratchet wheel 81 is a crank-arm 82 which has pivotally connected thereto at one of its ends a connecting rod or bar 83 the other end of which is pivotally connected to one end of a crank-arm 84 which is mounted at its other end on the shaft 69 adjacent one of the eccentrics 71. By this arrangement, it will be seen and understood that as the shaft 69 is rotated the crank-arm 84 thereon will be carried thereby thus imparting rocking movement to the shaft 62 through the instrumentalities of the connection 83 and crank-arm 82 thereby moving the arms 64 on the shaft 62 from the position shown by continuous lines to that shown by dotted lines in Fig. 6 of the drawings, from which latter position said arms will again be moved downwardly and forwardly so as to force one of the strips 53 through the guides 50 so as to present it edgewise to the longitudinal strips or pieces 30, or rather the slots 85 with which the upper edges of the strips or pieces 30 are provided to receive the transverse strips 53 of the crate.

Mounted in each of the guide-ways 17 formed by the rails or straps 16 and the upper portions of the side rails of the main frame are the journal boxes or blocks 18 for a shaft 86 which has near each of its ends a gear 87 which are located inwardly of the rails 16 as is clearly shown in Fig. 1 of the drawings. Journaled on the inner surfaces of each of the rails 12 and 13 of the main frame, is a gear 88, which gears are located in a vertical plane with the gears 87 and have extended beneath them an endless chain 89 which chains extend over the gears 87, above and along the top of the platform 20 and over gears 90 mounted on the shaft 79 near each of its ends but inwardly of the side rails of the main frame. The chains 89 or belts, are connected transversely at suitable points by means of cross-bars or cleats 91 which are used for the purpose of engaging the rear ends of the strips or members 30 of the crates or racks, in order to move them forwardly in their guide-ways or chutes. Each of the blocks or journal boxes 18 for the shaft 86 carries on its lower portion a horizontally disposed rack 92, which racks mesh with pinions 93 mounted on the shaft 94, see Fig. 5, transversely journaled on the main frame near and below the rear end of the platform 20 of said frame. The shaft 94 has on each of its ends a hand wheel 95 to be used for turning said shaft and the pinions thereon, so as to move the racks 92 back and forth and consequently the shaft 86 and gears 87 thereon. This can be done by slipping the chains 89 off the idlers or gears 88, when it is apparent that there will be sufficient slackness in the belts or chains to permit the shaft 86 and the gears 87 thereon to be moved rearwardly to about the position shown in dotted lines in Fig. 5 of the drawings, so as to accommodate strips 30 of different lengths for the crate. Each of the guide-rails 16 is provided with a longitudinally extended slot 16$^a$ which are for the reception and operation of headed screw-bolts 18$^a$ one of which is located in the upper portion of each of the journal-boxes or blocks 18 and extended through the slot 16$^a$ in the guide rail thereabove. These bolts are employed to secure the blocks or boxes 18 when the latter are moved outwardly or toward the outer ends of said slots, in order to prevent the shaft 86 moving back from the dotted line position shown in Fig. 3, for it is apparent that said bolts may be turned in the proper direction so as to rigidly hold the said blocks or boxes in their outward positions.

From the foregoing and by reference to the drawings it will be readily understood and clearly seen, that assuming the parts are in the positions shown in Figs. 1, 3 and 5 of the drawings, a number of strips, which as before stated go to make up the longitudinal members of the crates, may be placed edgewise one on top of the other in each of the magazines or chutes 26, when the lowermost strip 30 in each of the magazines will rest on the platform 20 of the main frame in such a way that its upper edge will be located a slight distance below the cover 31 of each of the extensions 29 of the magazine. Now, by applying power to the pulley 70 and driving shaft 69, it is evident that the eccentrics 71 will be rotated and through their movements and connections with the plunger bar 48 said bar will be raised and lowered so as to cause the lower ends of the plungers 50 to strike the upper edges of the strips 53, which form the transverse members of the crates, as they are fed through the guides 56 from the chutes 54 by means of the feeding arms 64 which are moved back and forth by means of the rock shaft 62 on which they are mounted, and its connections with the shaft 69. In the foregoing operation it will be understood that as the connecting bars 73 of the plunger bar 48 are reciprocated, the ratchet wheel 81 will be rotated by means of the bell-crank-lever 78, pawl 80 and connection 75 which is secured at one of its ends to one of the connections 73 and through the operations of the shaft 79 and the gears 90 thereon, the chains 89 will be driven over and along the platform 20, in which operation one of the cleats or transverse bars 91 will engage the rear ends of the strips 30 and force them forwardly on said platform, in such a way that the recesses 85 in the upper edges of the strips 30 will be placed in alinement one at a time with the lower portion or discharging ends of the guides 56 so that said recess will receive one of the transverse strips 53 which strips are by preference formed with transverse grooves 96 on each of their sides at points the same distance apart as the distance between the longitudinal strips 30, so that the grooves or channels 96 will receive the edges of the recesses 85 and thus interlock the transverse members and longitudinal members of the crate. It will be understood that just as each of the strips 53 is about to be delivered from the discharging ends of the guides 56 the plungers 50 will strike the upper edge of said strip and force it downwardly into the recesses 85 of the various strips 30 or longitudinal strips of the crate. If it is desired to stop the feeding of the transverse strips 53, this can be done by turning the lever 43 to about the position shown by dotted lines in Fig. 6 of the drawings, when it is apparent that the shorter arm 44 of the said lever will hold the strips 53 against downward movement in their chutes 54 of guide-ways. By adjustably mounting the magazines or chutes 26 on the shafts 23 and 36 it is apparent that they can be readily located at suitable distances apart so as to afford the required sized compartments, and it is also evident that as the chutes 54 are detachably mounted on the uprights 46, they can be adjusted with respect to each other by loosening the bolts 68 so as to permit them to be slid toward or from each other on the supporting bar 66 therefor. By this arrangement the chutes 56 can be adjusted for strips 53 of different lengths.

It will be noted that the closed front portions 32 of the chutes 26 will act as abutments to prevent the strips or pieces 30 resting on the lowermost strips 30, being carried forwardly as said lowermost strips are moved in said direction by the bars or cleats 91 of the endless conveyer which consists of the two chains or belts 89 and the bars or cleats 91 which unite said chains or belts. It will also be understood that the driving mechanism operates in such a manner as to move the conveyer intermittently in order to permit the transverse strips 53 being placed in the grooves or recesses 85 in the upper portions of the longitudinal strips 30 of the crate. By suitably adjusting the projection 76 on the connecting rod 75 in the slots 77 of the bell-crank-lever 78, it is apparent that the intermittent movement of the conveyer can be regulated to correspond with the distances between the slots or recesses 85 in the longitudinal pieces of the crate or rack.

Having thus fully described my invention, what I claim as new and desire to secure by Letters Patent is—

1. In a machine of the character described, the combination with a plurality of magazines adapted to hold a plurality of recessed strips, of means located near the discharging ends of said magazines for holding strips transversely thereof, means for intermittently and simultaneously ejecting recessed strips from the magazines, means for ejecting the transversely disposed strips one at a time from the holding means therefor, and means for forcing the same into the recesses of the first named strips.

2. In a machine of the character described, the combination with a plurality of vertically disposed and spaced apart magazines each adapted to hold a plurality of recessed strips one on the other, and provided with means to prevent but one of said strips being ejected at a time from each magazine, of means located near the discharging ends of said magazines for holding strips transversely thereof, means for intermittently and simultaneously ejecting recessed strips from the magazines, means for ejecting the transversely disposed strips one at a time from the holding means therefor, and means for forcing the same into the recesses of the first named strips.

3. In a machine of the character described, the combination with a plurality of magazines adapted to hold a plurality of recessed strips one on the other, of means located near the discharging ends of said magazines for holding strips transversely thereof, means mounted near the holding means and extended there-under to control the discharge of the transverse strips, means for intermittently and simultaneously ejecting recessed strips from the magazines, means for ejecting transversely disposed strips one at a time from the holding means therefor, means for forcing the same into the recesses of the first-named strips.

4. In a machine of the character described, the combination with a plurality of vertically disposed and spaced apart magazines each adapted to hold a plurality of recessed strips one on the other, and provided with means to prevent but one of said strips being ejected at a time from each magazine, of means located near the discharging ends of said magazines for holding strips transversely thereof, means mounted near said holding means and extended thereunder for controlling the discharge of the transverse strips, means for intermittently and simultaneously ejecting recessed strips from the magazines, means for ejecting the transversely disposed strips one at a time from the holding means therefor, and means for forcing the same into the recesses of the first named strips.

5. In a machine of the character described, the combination with a plurality of vertically disposed and spaced apart magazines, each of said magazines having at its lower portion a forwardly projecting extension and above said extension with a stop uniting the side walls of the magazine at its front portion, of means located near the discharging ends of said magazines for holding strips transversely thereof, means for intermittently ejecting recessed strips from the magazines, means for ejecting transverse strips one at a time from the holding means therefor, and means for forcing the same into the recesses of the first named strips.

6. In a machine of the character described, the combination with a plurality of magazines adapted to hold a plurality of recessed strips, of a vertically disposed chute located near each side of the discharging ends of the magazines and having their adjacent surfaces open to receive a plurality of strips transversely disposed with respect to said magazines, guides leading downwardly and forwardly from the lower ends of said chutes, vertically reciprocating means located above the lower ends of said guides for impingement against said transverse strips as they are discharged, means for intermittently ejecting recessed strips from the magazines, means for ejecting transverse strips one at a time from the holding means therefor, and means for reciprocating the aforesaid impinging means.

7. In a machine of the character described, the combination with a main frame, of a platform horizontally mounted thereon, a plurality of vertically disposed magazines longitudinally mounted above said patform each adapted to hold one on the other a plurality of strips having spaced apart recesses in their upper edges, an endless conveyer mounted for longitudinal movement between said magazines and said platform and having means to engage each of the lowermost of said strips, means on the front portion of each of the magazines to prevent the forward movement of all of the strips carried thereby except the lowermost strip, and means to intermittently move the conveyer.

8. In a machine of the character described, the combination with a main frame, of a platform horizontally mounted thereon, a plurality of magazines longitudinally mounted above said platform each adapted to hold one on the other a plurality of strips having spaced apart recesses in their edges, means to move the lowermost strip of each magazine forwardly and intermittently, means located near the discharging ends of said magazines for holding strips transversely thereof, means for ejecting the transversely disposed strips one at a time from said holding means therefor, means reciprocatingly mounted for vertical movement to impinge against said transverse strips, as they are fed to the recessed strips, and means for giving intermittent movement to the recessed strips in forcing the transverse strips into the recesses of the latter.

9. In a machine of the character described, the combination with a main frame, of a platform horizontally mounted thereon, a plurality of vertically disposed magazines longitudinally mounted above said patform and each adapted to hold the other, a plurality of strips having recesses spaced apart in their upper edges, an endless conveyer mounted for longitudinal movement between said magazines and platform and having means to engage each of the lowermost strips, a vertically disposed chute mounted on the main frame near the discharging ends of the magazines and having their adjacent surfaces open to receive a plurality of transversely disposed strips, guides leading downwardly and forwardly from the lower ends of the chutes, forcing means for the transverse strips mounted for vertical movement above the lower ends of said guides, means to eject the transverse strips one at a time from said chutes, means to intermittently move the conveyer and means to reciprocate said forcing means.

ADAM BLUEGE.

Witnesses:
CHAS. C. TILLMAN,
L. PUZICK.

Copies of this patent may be obtained for five cents each, by addressing the "Commissioner of Patents. Washington, D. C."